(12) United States Patent
Herwig et al.

(10) Patent No.: US 6,567,253 B1
(45) Date of Patent: May 20, 2003

(54) APPARATUS TO SENSE A SILICON CONTROLLED RECTIFIER SHORT CIRCUIT

(75) Inventors: Warren E. Herwig, Oshkosh, WI (US); Bryan Shupita, Mankato, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/683,508

(22) Filed: Jan. 10, 2002

(51) Int. Cl.[7] ................................................. H02H 3/20
(52) U.S. Cl. ............................ 361/91.8; 361/18; 363/54
(58) Field of Search ............................... 361/18, 20, 21, 361/55, 52, 53, 100, 91.8; 363/85, 128, 54

(56) References Cited

U.S. PATENT DOCUMENTS

| | | | |
|---|---|---|---|
| 3,590,323 A | * 6/1971 | Mapham et al. | 361/75 |
| 4,234,917 A | * 11/1980 | Suzuki et al. | 219/668 |
| 4,356,525 A | * 10/1982 | Kornrumpf et al. | 361/13 |
| 4,357,645 A | 11/1982 | Lilienthal | |
| 5,624,589 A | 4/1997 | Latvis et al. | |
| 6,078,173 A | * 6/2000 | Kumar et al. | 324/158.1 |

OTHER PUBLICATIONS millerwelds.com/professional/products//mig/M04810/; (no date).

* cited by examiner

*Primary Examiner*—Kim Huynh
(74) *Attorney, Agent, or Firm*—Ziolkowski Patent Solutions Group, LLC (57) ABSTRACT

An apparatus to sense an SCR short circuit failure and prevent overheating of solid-state power supply equipment, such as a welder, during an occurrence of the short circuit failure is provided. The apparatus includes a detector circuit capable of sensing a short circuit of an SCR in the power supply equipment. The detector circuit senses each voltage of a poly-phase input and generates a fault signal upon substantially simultaneous detection of a zero-cross voltage condition for each phase of the poly-phase input. A control circuit is configured to receive the fault signal of the detector circuit and generate an output to prevent fault current flow through to power supply equipment.

25 Claims, 6 Drawing Sheets

APPARATUS TO SENSE A SILICON CONTROLLED RECTIFIER SHORT CIRCUIT

BACKGROUND OF THE INVENTION

The present invention relates generally to a protection circuit for electrical apparatus, and more particularly, to an apparatus and system for detecting when silicon controlled rectifier (SCR) control elements in solid-state power supply equipment have failed.

SCRs are known in the power electronics industry for their use as high power and current switching devices. Such devices have found wide application in solid-state control systems where it is desired to control the voltage, current, and/or power supplied to a load. Generally, in single phase or poly-phase systems, one or more SCRs can be connected in series with a load to rectify a.c. to d.c. and control power to the d.c. load. SCRs can be further connected in a back to back relationship to an alternating current (AC) supply source, to supply a.c. current, voltage, or power to an a.c. load. Typically, SCRs are controlled to trigger into conduction at an appropriate time in the positive and negative half cycles of the AC supply. The time between the zero crossing of the AC supply waveform and the moment at which the SCRs are driven into conduction is commonly referred to as the firing angle of the SCR. Adjusting the firing angle provides a means for controlling the voltage, current, and/or power delivered to the load.

Prior art includes different methods of detecting operating conditions, including shorted SCRs, in a power supply source. As an example, one method detects a shorted SCR by using an amplitude detection circuit. Under such a short circuit condition, the faulted SCR causes the three-phase line or circuit to, in effect lose two phases and operate in a single-phase mode. Since the amplitude of the two phase voltages approach ½ amplitude, such faulted operation can be amplitude detected and the power supply disconnected from the three-power line.

A typical three-phase power supply includes a three-phase transformer having three primary and three secondary windings. The secondary windings provide three phase input voltages to a six SCR bridge. In the single-phase mode, two of the secondary voltages approach one-half of the amplitude of a third secondary voltage. The amplitude detection circuit is configured to detect the reduced amplitude of one or more of three secondary voltages of the three-phase transformer. The amplitude detection circuit is connected to the input of the SCR bridge and initiates a control signal that interrupts the input line power to the power source. The amplitude detection circuit monitors the three secondary voltages which are half-wave rectified, scaled by a voltage divider, filtered by a capacitor and compared to a fixed d.c. voltage by three voltage comparators. Outputs from the three voltage comparators are connected in an OR circuit such that, if the secondary inputs are less than some predetermined threshold, the output of the three input OR circuit is switched to a 0 Vdc output. The switching of the OR output to 0 Vd.c. causes the power source's three-phase line contactor to open and the power source to be de-energized.

Problems exist with the current state of the art devices and methods used for amplitude detecting. Amplitude detection methods using OR circuit connections can fail to provide a proper signal indicating when a short circuit condition occurs. Variations in the secondary voltages due to voltage spikes in the primary windings or other fluctuations can cause false signals to the amplitude detection circuit resulting in unnecessary shut down of the power supply.

Under a shorted or faulted SCR condition, the current delivered to the transformer is uncontrolled and limited only by the voltage source and the impedance of the voltage source. The extremely high current delivered under such a condition, for multiple AC cycles, can cause overheating and result in damage to the power supply equipment.

There is a need for an apparatus and system capable of reliably sensing an SCR short circuit in solid-state power supply equipment. It would therefore be desirable to have an apparatus configured to detect a short circuit condition of an SCR and interrupt current flow to the solid-state power supply equipment in response thereto.

BRIEF DESCRIPTION OF THE INVENTION

The present invention is directed to an apparatus and system to reliably sense an SCR short circuit in solid-state power supply equipment and output a signal or pulse capable of preventing extremely high short-current flow through the equipment to overcome the aforementioned concerns.

The present invention is directed to a protection circuit configured to prevent overheating of solid-state power supply equipment, such as a welder, during an occurrence of a short circuit condition in the control elements of the equipment. The circuit includes a shorted SCR detector circuit capable of detecting a short circuit condition of an SCR in the power supply equipment. The shorted SCR detector circuit monitors the transformer secondary voltages and generates an output signal or pulse, if a short circuit condition one one or more of the SCRs is detected. A control circuit receives the output signal or pulse from the shorted SCR detector circuit and generates an output capable of preventing current flow to the power supply equipment.

In accordance with one aspect of the present invention, an apparatus to sense an SCR short circuit failure includes a detector circuit configured to sense each voltage of a poly-phase input, such as a three-phase input, and generate a fault signal. The fault signal is generated upon substantially simultaneous detection of a zero-cross voltage condition for each phase of the poly-phase input. The invention also has a control circuit configured to receive the fault signal of the detection circuit and generate an output to interrupt current flow to the apparatus.

In accordance with another aspect of the present invention, a system to detect a short circuit of an SCR in a welder includes an electric current regulator for controlling electric current flow in the welder. The invention also includes a three-phase transformer connected to the electric current regulator. The electric current regulator is configured to receive a three-phase power supply input. The three phase transformer and the shorted SCR detecting means are capable of transforming the three-phase power supply voltages into three single phase detector inputs, wherein each of the single phase voltages lead or lag other phases under normal operating conditions. The system further includes a plurality of SCRs configured to receive the three single-phase voltages and generate a welder output. Additionally, the system has a detector circuit configured to receive and monitor the three single phase voltages and create a fault condition output signal capable of preventing electric current flow to the electric current regulator, if any one of the SCRs is shorted.

In accordance with the process of the present invention, a method to sense an SCR short includes the steps of sensing input voltage to a plurality of SCRs and comparing the input voltage to each SCR. If each input voltage is within a given range at a substantially similar time, then the method interrupts the line input voltages to the plurality of SCRs preventing short-circuit current flow through the SCRs.

In a further aspect of the present invention, an apparatus for detecting an SCR short circuit condition in a welder includes a means for controlling electric current flow through at least one silicon controlled rectifier and a means for sensing instantaneous voltages of each single phase input. The invention further includes a means for generating an output signal to interrupt the means for controlling electric current flow when each of the sensed instantaneous voltages are in a specified voltage range.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

Figure 1:
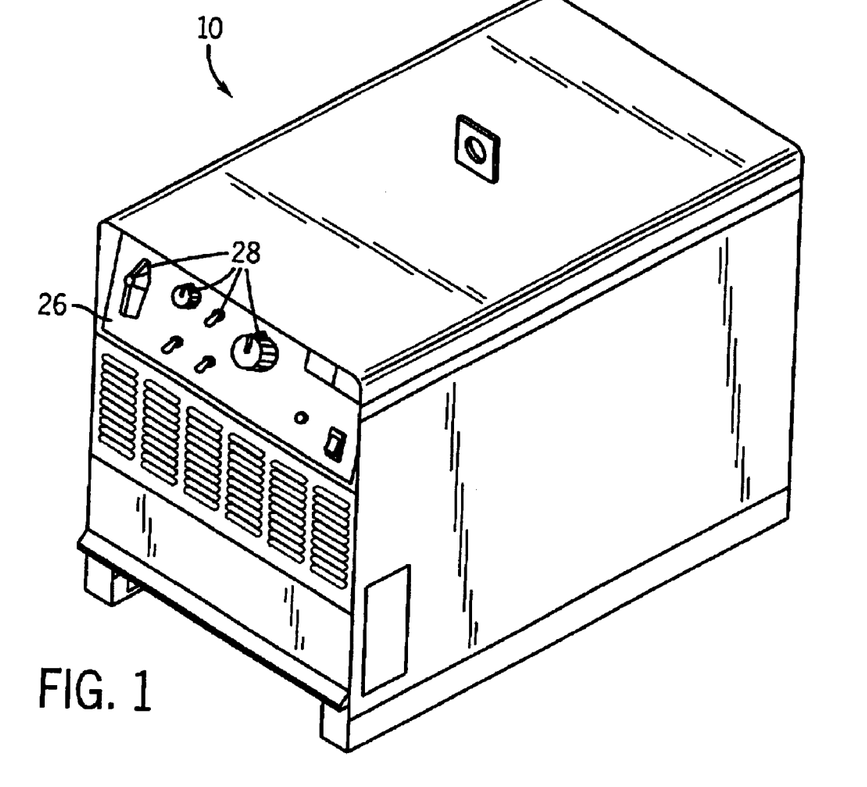
FIG. 1 is a perspective view of a welder incorporating the present invention.

Referring to FIG. 1, one example of a solid-state power supply equipment that includes the present invention is a welder 10. The welder 10 is connected to a three-phase power line (not shown) and is configured to provide a welding voltage and current to an object desired to be welded. A control panel 26 of the welder 10 includes a set of controls 28 that can be used by an operator to select a desired welding current amperage value.

Figure 2:
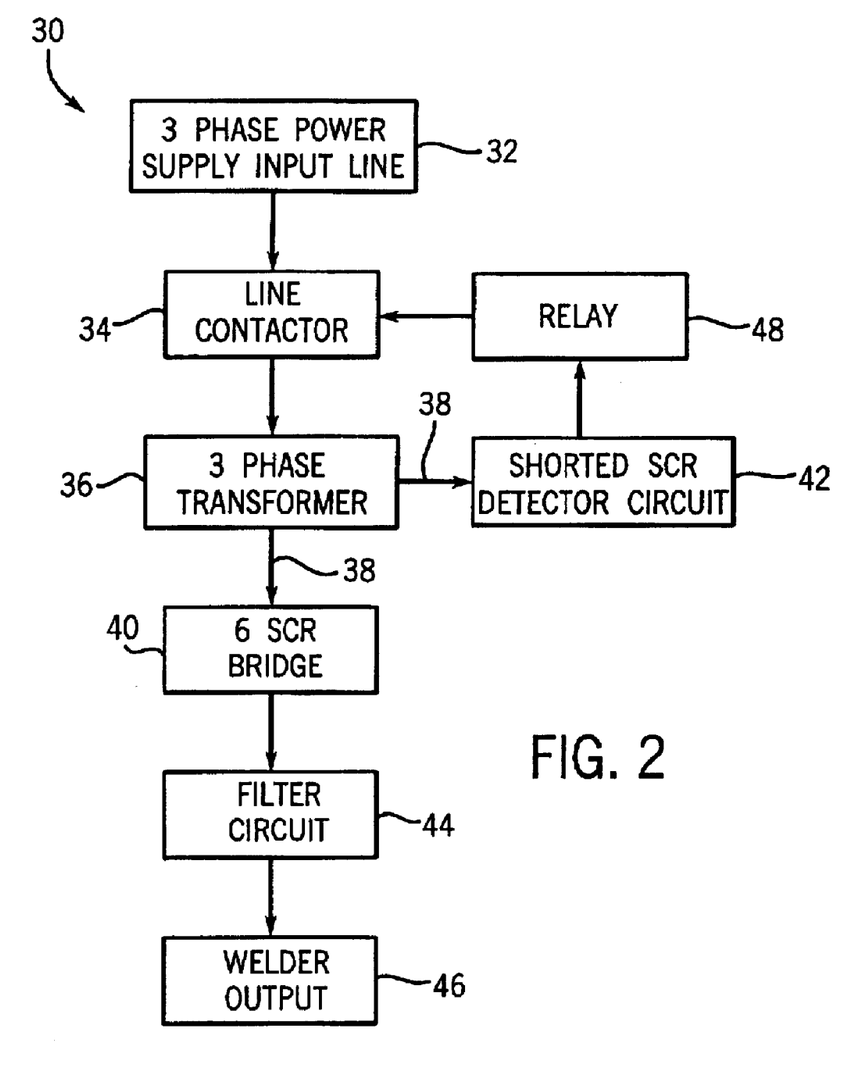
FIG. 2 is a block diagram of a power supply system of the welder of FIG. 1.

FIG. 2 is a block diagram of a power supply system 30 of the welder 10 of FIG. 1. Three-phase line power is supplied at an input 32 and connected to a three-phase line contactor 34 that conducts the three-phase input 32 to a three-phase transformer 36. The transformer 36 is capable of transforming and isolating the three-phase electric current 32 into a lower voltage, higher current 38 that flows through a plurality of SCRs, such as a six SCR bridge 40. The SCRs can comprise any silicon-controlled element capable of regulating electric current flow to a filter circuit 44. The filter circuit 44 is configured to smooth the rectified a.c. sine waveforms, from the SCR Bridge 40, into a near d.c. waveform, which is then made available as welder output 46 to perform welding operations at voltages and currents determined by operator settings of the controls 28.

A shorted SCR detector circuit 42 receives the three phase voltages 38 from the transformer 36, separates the three-phases into separate single-phase voltages, and determines if a fault condition exists. A fault condition exists if one or more of the SCRs of the SCR Bridge 40 are shorted. If no fault condition is detected, a relay 48 and the line contactor 34 remain in a closed position permitting the welder 10 to generate welder output 46. If a faulted SCR condition is detected by the detector circuit 42, the relay 48 and line contactor 34 open. In the open position, the power supply system 30 is protected from overheating due to uncontrolled electric current flow in the system 30.

Figure 3:
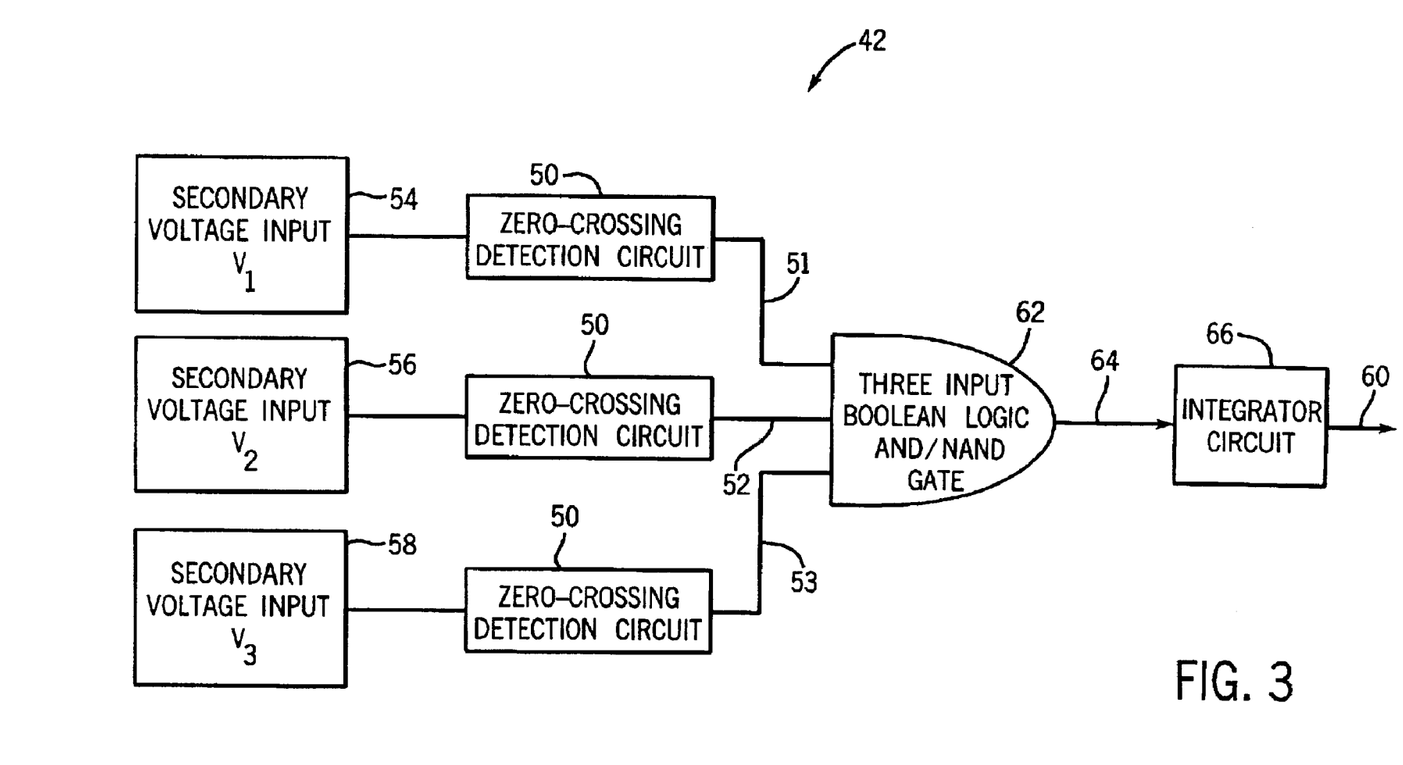
FIG. 3 is a block diagram of shorted SCR detector circuit and relay control circuit connected to the transformer secondary of the power supply system of FIG. 2.

Referring now to FIG. 3, a block diagram of the shorted SCR detector circuit 42 connected to the transformer secondary of the power supply system 30 of FIG. 2 is shown. The detector circuit 42 has a plurality of zero-crossing detection circuits 50, a three input AND/NAND gate 62, and an integrator circuit 66. Three single-phase transformer input voltages $V_1$, $V_2$, and $V_3$ respectively, 54, 56, and 58 are derived from the secondary voltage 38 of the transformer 36 of FIG. 2 and applied to the three detector circuits 50. The detector circuits 50 are configured to sense each voltage of a poly-phase input, such as $V_1$, $V_2$, and $V_3$, from the transformer 36 and generate a fault condition output signal or fault signal that is transmitted to the AND logic gate 64. Generally, the zero-cross condition is an instantaneous voltage within a given voltage range or window, which is preferably between +/−1.7 Vd.c. Although three zero-crossing detection circuits 50 are described for a three-phase transformer voltage input, any single or poly-phase SCR detector 42 can be implemented by providing a zero-crossing detection circuit 50 for each phase connected to the shorted SCR detector circuit 42.

Each individual fault signal 51, 52, and 53 is received by the three input boolean logic AND/NAND gate circuit configurations 62, which generate an output pulse 64 when voltages 51, 52, and 53 cross zero at substantially the same time. As the shorted SCR condition continues, the series of voltage pulses 64 are integrated over time by the integrator circuit 66 to produce the output voltage 60, which de-energizes the relay 48 in FIG. 2. The integrator circuit 66 typically requires a substantial number of consecutive voltage pulses 64 before detecting the shorted SCR condition and initiating the output voltage 60, which shuts down the power source. Line voltage disturbances and transient conditions of typically 0.1 seconds or less in duration are therefore not detected as shorted SCRs.

Therefore, under a fault or shorted SCR condition, the output voltage 60 is capable of preventing electric current flow through the electric line contactor 34. That is, the output 60 is configured to cause a de-energizing of line contactor 34 which interrupts power to the welder 10 upon an SCR short circuit in the SCR Bridge 40. Although FIG. 3, a block diagram of the shorted SCR detector circuit 42, includes a zero-crossing detector, a three input AND/NAND logic gate and a integrator circuit, numerous permutations of circuits capable of representing equivalent logic can be implemented with the present invention as is known to those skilled in the art.

Figure 4:
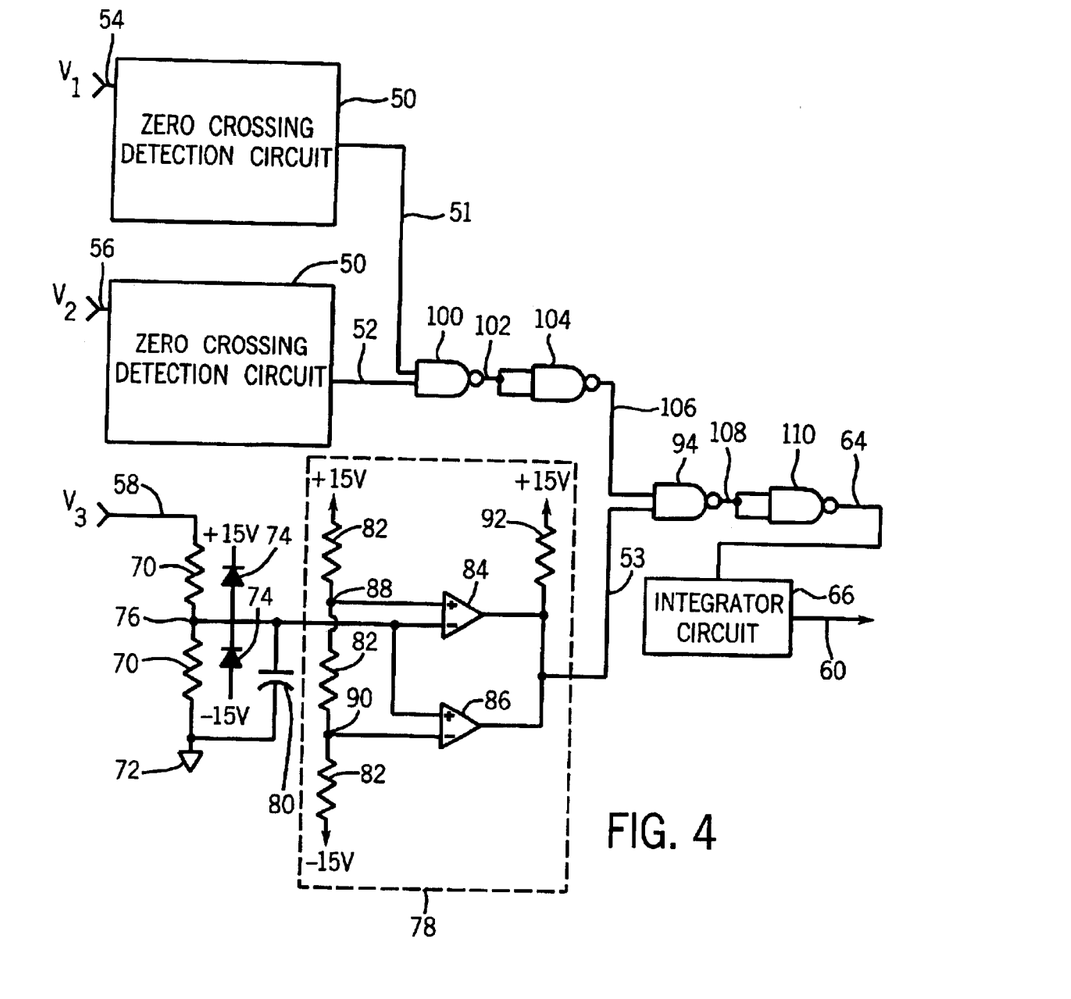
FIG. 4 is a circuit diagram of the SCR detector circuit and relay control circuit of FIG. 3.

FIG. 4 is a circuit diagram of the shorted SCR detector of FIG. 3. One embodiment of the zero-crossing detection circuit 50 includes a pair of resistors 70 in series and connected to a zero voltage point or ground 72 to perform as a voltage divider for a single-phase voltage input from the transformer 36, such as input $V_3$ 58. Two clamping diodes 74 connect to the resistors 70 at a voltage division point 76, and prevent the reduced voltage input at the voltage division point 76 from exceeding certain limits. The clamping diodes 74 limit voltage sensed by a window comparator circuit 78 connected in series to the resistors 70. A capacitor 80 is configured to filter high frequency noise from the single-phase a.c. voltage input $V_3$ 58 at the voltage division point 76.

The comparator 78 includes three resistors 82 in series between +/−15 Vd.c. power sources and a pair of amplifiers 84, 86. The amplifiers 84, 86 are connected to the voltage division point 76, to reference voltage at a first node 88 and to reference voltage at a second node 90. The output 53 of comparator 78 is the outputs of the amplifiers 84, 86 and is in parallel with an output resistor 92 connected to a 15 Vd.c. power supply and one of two inputs of a first NAND gate 94. Preferably the comparator 78 includes a LM319 model amplifier configured to have a +1.7 Vd.c. voltage reference at the first node 88 and a −1.7 Vd.c. voltage reference at the second node 90, which produces a 15 Vd.c. comparator output pulse or a high pulse in the time interval when the single phase transformer voltage input $V_3$ 58 is between a +/−1.7 Vd.c. window. When the single-phase voltage input $V_3$ 58 is outside the +/−1.7 Vd.c. window, the comparator 78 does not transmit an output pulse or has a low output pulse 53 that does not trigger an output pulse from the first NAND gate 94.

Still referring to FIG. 4, the other two single-phase voltage inputs $V_1$, $V_2$, 54, 56 are fed into identical zero-crossing detection circuits 50. Comparator outputs 51 and 52 from the $V_1$ and $V_2$ detection circuits 50 are inputted into a second NAND gate 100 that has an output 102 inputted into both inputs of a third NAND gate 104. An output 106 from the third NAND gate 104 is fed into the other input of the first NAND gate 94. The first NAND gate 94 has an output 108 inputted into both inputs of a fourth NAND gate 110. The output of the fourth NAND gate 110 generates the gate output 64 to the relay control 66. The combined logic of gates 100, 104, 94 and 110 is identical to a 3-input logic gate.

Figure 5A:
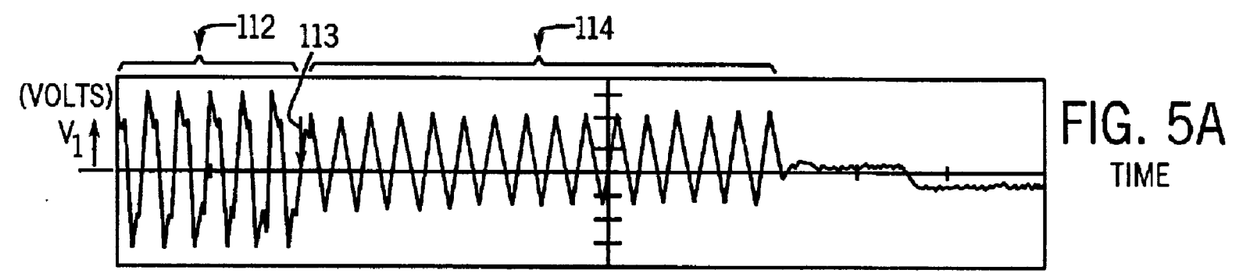
FIGS. 5A–C are voltage versus time graphs for each single phase input voltage of the shorted SCR detector circuit operating under a normal condition and a short circuit condition.
Figure 5B:
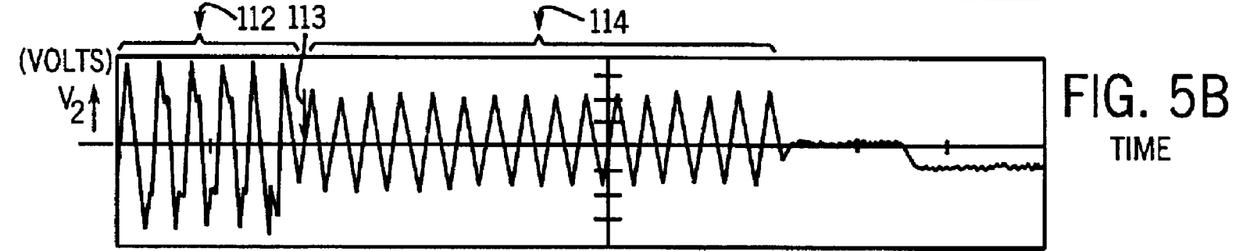
Figure 5C:
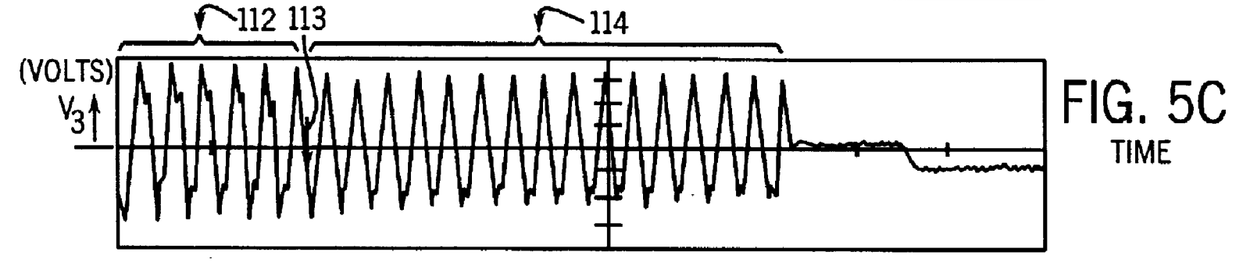
Figures 5D, 5E:
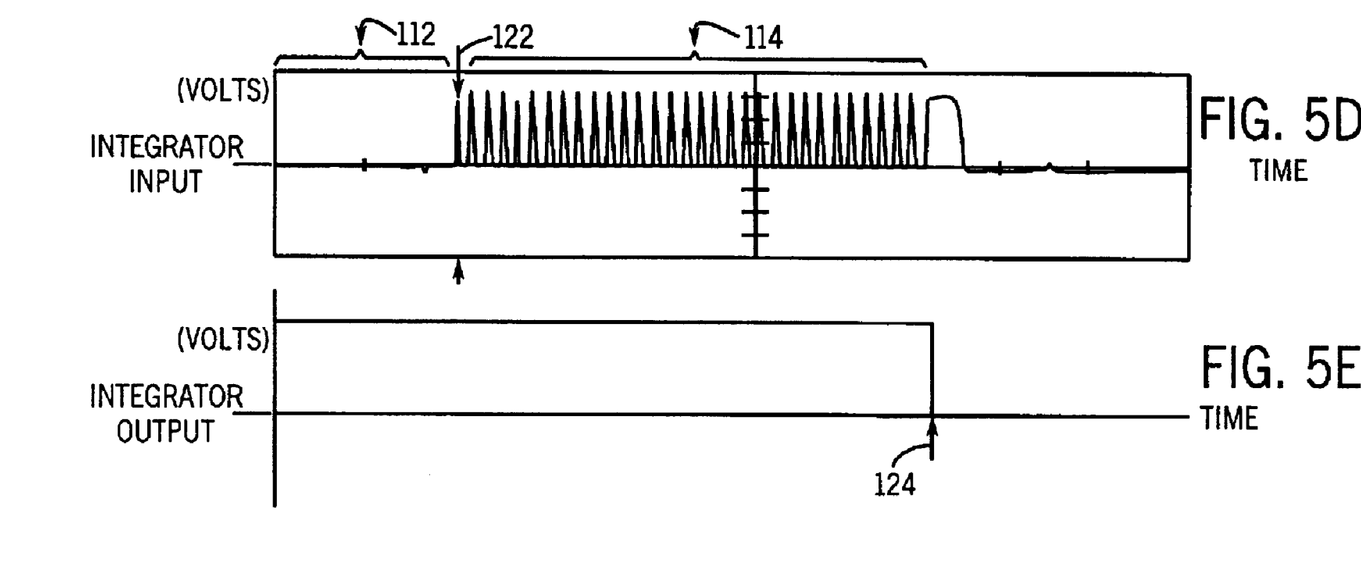
FIG. 5D is a voltage versus time graph showing the output from the shorted SCR detector circuit operating under a normal condition and a short circuit condition.
FIG. 5E is a voltage versus time graph showing the output from the integrator circuit before and after relay de-energization.

FIGS. 5A–C are voltage versus time graphs for each single phase input voltage of the shorted SCR detector circuit under a normal operating condition 112 and a short circuit condition 114. During a normal operating condition 112, each of the single-phase voltages $V_1$, $V_2$, and $V_3$ lead or lag one another by a 120° phase shift. After one or more of the plurality of SCRs 40 is shorted 113, a short circuit condition is shown under the arrows 114 where the single phase voltages $V_1$ and $V_2$ are now in phase with each other but 180° out of phase with $V_3$ FIG. 5D is a voltage versus time graph showing the output from the logic gates 64 of FIG. 3 under a normal condition 112 and a short circuit condition 114. Upon an occurrence of a short circuit to an SCR 40, a series of fault detecting pulses 122 occur as zero-crossings are detected simultaneous on all three phase voltages.

FIG. 5E is a voltage versus time graph showing the output 60 from the integrator circuit 66. Arrow 124 indicates when the output voltage 60 de-energizes the relay 48, which further de-energizes the line contactor 34.

In accordance with one aspect of the present invention, an apparatus to sense an SCR short circuit failure comprises a detector circuit configured to sense each voltage of a poly-phase input and generate a fault signal upon substantially simultaneous detection of a zero-cross voltage condition for each phase of the poly-phase input. The apparatus further includes a control circuit configured to receive the fault signal of the detection circuit and generate an output to interrupt current flow through each SCR.

In accordance with another aspect of the present invention, a system to detect a short circuit of an SCR in a welder includes a line contactor for controlling electric current flow in the welder that is configured to receive a three-phase power supply input. The system also includes a three-phase transformer. Additionally, a plurality of SCRs are configured to receive the transformed three-phase inputs and generate a welder output. Lastly, a shorted SCR detection method is configured to receive the three single phase detector inputs and create a fault condition output signal capable of preventing high short circuit current flows through the electric current regulator if any one of the SCRs is shorted.

In accordance with the process of the present invention, a method of sensing an SCR short includes the step of sensing input voltage to a plurality of SCRs. The method also has a step of comparing the input voltage sensed for each phase, and if each input voltage is within a given range at a substantially similar time, then interrupting the line input voltages to the plurality of SCRs.

In yet another aspect of the present invention, an apparatus for detecting a SCR short circuit condition in a welder is disclosed. The apparatus has a means for controlling electric current flow through at least one silicon controlled rectifier and a means for sensing instantaneous voltages of each single phase input. Furthermore, the apparatus includes a means for generating an output signal to interrupt the means for controlling electric current flow when each of the instantaneous sensed voltages are in a specified voltage range.

The present invention has been described in terms of the preferred embodiment, and it is recognized that equivalents, alternatives, and modifications, aside from those expressly stated, are possible and within the scope of the appending claims.

What is claimed is:

1. An apparatus to sense an SCR short circuit failure comprising:
   a detector circuit configured to sense each voltage of a poly-phase input and generate a fault signal upon substantially simultaneous detection of a zero-cross voltage condition for each phase of the poly-phase input; and
   a control circuit configured to receive the fault signal of the detector circuit and generate an output to interrupt current flow through each SCR.

2. The apparatus of claim 1 wherein the detector circuit comprises a zero-crossing detection circuit for each phase of the poly-phase input and the zero-cross condition is an instantaneous voltage within a given voltage range.

3. The apparatus of claim 1 wherein the detector circuit comprises a separate comparator connected to each phase of the poly-phase input to detect the zero voltage condition.

4. The apparatus of claim 3 wherein the separate comparators are triggered when a voltage on each phase is within a +/−1.7 Vdc window.

5. The apparatus of claim 1 connected to a welder and further comprising a de-energizing contactor connected to the control circuit to interrupt power to the welder upon an SCR short circuit.

6. The apparatus of claim 3 wherein the detector circuit further comprises a pair of clamping diodes connected between each of the separate comparators and the poly-phase input to limit voltage sensed by the separate comparators.

7. The apparatus of claim 1 wherein the SCR is any silicon controlled element.

8. The apparatus of claim 1 wherein the control circuit includes a logic circuit.

9. The apparatus of claim 8 wherein the logic circuit comprises a plurality of NAND gates configured to perform as a three-input AND gate.

10. The apparatus of claim 1 wherein the detector circuit includes a plurality of capacitors to high-frequency filter each phase of the poly-phase input.

11. A system to detect a short circuit of an SCR in a welder, the system comprising:

an electric current regulator for controlling electric current flow in a welder and configured to receive a three-phase power supply input;

a three-phase transformer connected to the electric current regulator and capable of transforming the three-phase power supply input into three single-phase detector inputs;

a plurality of SCRs configured to receive the three single phase detector inputs and generate a welder output; and a detector circuit configured to receive the three single phase detector inputs and create a fault condition output signal capable of preventing electric current flow through the electric current regulator if any one of the SCRs is shorted.

12. The system of claim 11 wherein the detector circuit is an interval timing circuit and has a plurality of comparators to sense a voltage of each of the three single-phase detector inputs.

13. The system of claim 12 wherein each of the plurality of comparators is configured to generate one of a high output and a low output whenever a line voltage for a given phase is within a predetermined window about a zero-crossing point.

14. The system of claim 11 wherein the fault condition output signal occurs only if each of the plurality of comparators senses substantially simultaneous voltages for each of the three single phase detector inputs in a voltage range.

15. The system of claim 11 further comprising a de-energizing contactor connected to the detector circuit to interrupt power to the welder upon an SCR short circuit.

16. The system of claim 11 wherein the electric current regulator is a plurality of relays and a relay control receives the fault condition output signal of the detector circuit and causes the plurality of relays to open preventing electric current flow in the welder.

17. The system of claim 11 wherein the plurality of SCRs comprises a silicon controlled rectifier bridge having at least six silicon controlled rectifiers.

18. A method of sensing an SCR short comprising:

sensing input voltage to a plurality of SCRs; and comparing the input voltage sensed at each SCR and if each input voltage is within a common given range at a substantially similar time, then interrupting line input voltages to the plurality of SCRs.

19. The method of claim 18 further comprising the step of sending a single-phase input voltage to each of the plurality of SCRs.

20. The method of claim 19 further comprising the step of high frequency filtering each single-phase input voltage prior to comparing the input voltage sensed at each SCR.

21. The method of claim 19 further comprising the step of voltage dividing each sensed SCR single phase input voltage before comparison.

22. The method of claim 18 wherein the given range is +/−1.7 Vdc.

23. The method of claim 18 wherein a plurality of voltage comparators compare each sensed input voltage to the plurality of SCRs and generate output signals capable of generating a fault signal.

24. An apparatus for detecting an SCR short circuit condition in a welder comprising:

means for controlling electric current flow through at least one silicon controlled rectifier;

means for sensing instantaneous voltages of each single phase input; and means for generating an output signal to interrupt the means for controlling electric current flow when each of the sensed instantaneous voltages is in a common specified voltage range.

25. The apparatus of claim 24 wherein the means for generating an output signal generates the output signal when each of the sensed instantaneous voltages are about a zero-crossing point and within the specific voltage range.

* * * * *